United States Patent Office 3,343,161
Patented Sept. 19, 1967

3,343,161
RADAR SYSTEMS HAVING IMPROVED DOPPLER-SHIFT-RESPONSIVE MEANS
Henri C. Billottet, Paris, France, assignor to Compagnie Francaise Thomson Houston-Hotchkiss Brandt, a corporation of France
Filed Aug. 30, 1965, Ser. No. 483,743
Claims priority, application France, Aug. 28, 1964, 986,541, Patent 1,413,212
25 Claims. (Cl. 343—7.7)

ABSTRACT OF THE DISCLOSURE

Radar system wherein, for the purpose of defeating defensive measures designed to alter the frequency of pulsed or continuous waves reflected by a target, two or more radar frequencies are transmitted concurrently or in rapid alternation and the corresponding incoming waves are heterodyned with the corresponding outgoing frequencies to yield respective low-frequency signals indicative of supposed Doppler shifts at the target; the frequency ratio of the low-frequency signals is compared with the frequency ratio of the transmitted waves and, if the comparison indicates substantial identity within a predetermined tolerance range, these signals are treated as true indications of target velocity.

---

This invention has as its main object the provision of an improved radar system capable of discriminating between true and spurious Doppler-shift signal components.

The invention is applicable both to continuous-wave and to pulsed radar systems, and the term radar as used throughout the application and claims is to be interpreted in its broadest meaning as applying to all systems of these various characters.

The chief utility of the invention lies in the monitoring of moving targets equipped with "Doppler-scrambling" beacons.

Various types of jamming and scrambling devices have been used for many years aboard aircraft, missiles and other targets, in order to prevent or hamper the monitoring and tracking thereof by adverse radar stations. In the past such devices have taken the straightforward form of radio-noise generators capable of jamming reception of the radar echo signals. Various expedients have now been developed which are effective to render such jammers comparatively innocuous.

However, a recent development in the field of jamming and scrambling equipment has been the so-called scrambler beacon. Such a beacon, placed aboard a target, is capable of receiving radar signals beamed at it and retransmitting somewhat altered signals as though they were normal echo signals, thereby imparting misleading information regarding the target's actual motion to the radar station. Specifically, the scrambler beacon may transmit deceiving signals that are time-shifted with respect to the radar signals received by it, thereby giving the radar that is trying to monitor or track the target the false impression that the target distance is other than it actually is. In addition, the deceiving signals retransmitted by the scrambler beacon can be altered in frequency with respect to the frequency of the radar signals, thereby concealing the true amount of Doppler shift sustained by the radar signals on account of the target's motion, and including the radar to show an erroneous indication of the target's radial velocity.

This type of Doppler scrambling beacon has been found particularly troublesome and to the best of my knowledge there has been no method heretofore available for parrying such a device. It is a specific object of this invention to fill this gap.

Another object is to provide an effective and reliable means for discriminating between true and spurious Doppler-shift components that may be present in the total frequency shift sustained by a radar signal on being sent back from a target, and to derive indications concerning the target's motion from only the true Doppler-shift components, indicative of the target's true radial velocity with respect to the radar, while rejecting information that would otherwise be derived from any spurious frequency shifts, whatever their cause.

An additional object is the provision of improved frequency-comparison means capable of testing the proportionality between sets of frequency values with very great precision and presenting the result of the test in a form immediately appropriate for digital processing. Other objects and advantages will appear hereinafter.

The invention is based on the well-known fact that the Doppler-shift sustained by a signal on being reflected from a target is proportional to the frequency of the signal. According to this invention, therefore, radar signals are beamed at a target at two (or more) different carrier frequencies. The response signals are demodulated to derive the frequency shifts present between each transmitted signal and the related response signal. The set of frequency-shift values thus derived are tested against the set of transmission-frequency values used, in order to ascertain whether or not the two sets of values are mutually proportional. If they are, the frequency shifts can be considered to be true Doppler shifts and taken as trustworthy indications of the target's radial velocity; otherwise the frequency shifts are shown to be spurious, and any information concerning the target's motion, as provided by the response signals from which the frequency shifts were derived, is rejected.

In preferred embodiments of the invention, the proportionality test between the frequency-shift values and the transmission-frequency values is made by applying each frequency-shift signal to an associated frequency-analyzing network comprising a set of parallel-connected frequency-selective circuit paths. The frequency values selected by corresponding circuit paths in the respective networks are made proportional to the related transmission frequencies. Thus, if all the frequency-shift signals are passed by corresponding circuit paths in the respective networks, said shift signals must necessarily be proportional, or very nearly proportional, to the related transmission frequencies, and can be considered as true Doppler components. Otherwise they are spurious shift components.

Means are also provided for rejecting deceptive signals that have been randomly shifted in time on retransmission from a target beacon but have not been shifted in frequency. Such means comprise a comparator device in which a velocity indication derived from the sensed Doppler shift is compared with a velocity indication derived from the time variation of target distance. In case of a discrepancy between the two velocity indications, the received signals are shown to be deceptive and are rejected.

Exemplary embodiments of the invention will now be described for purposes of illustration with reference to the accompanying drawing wherein.

Figure 8:
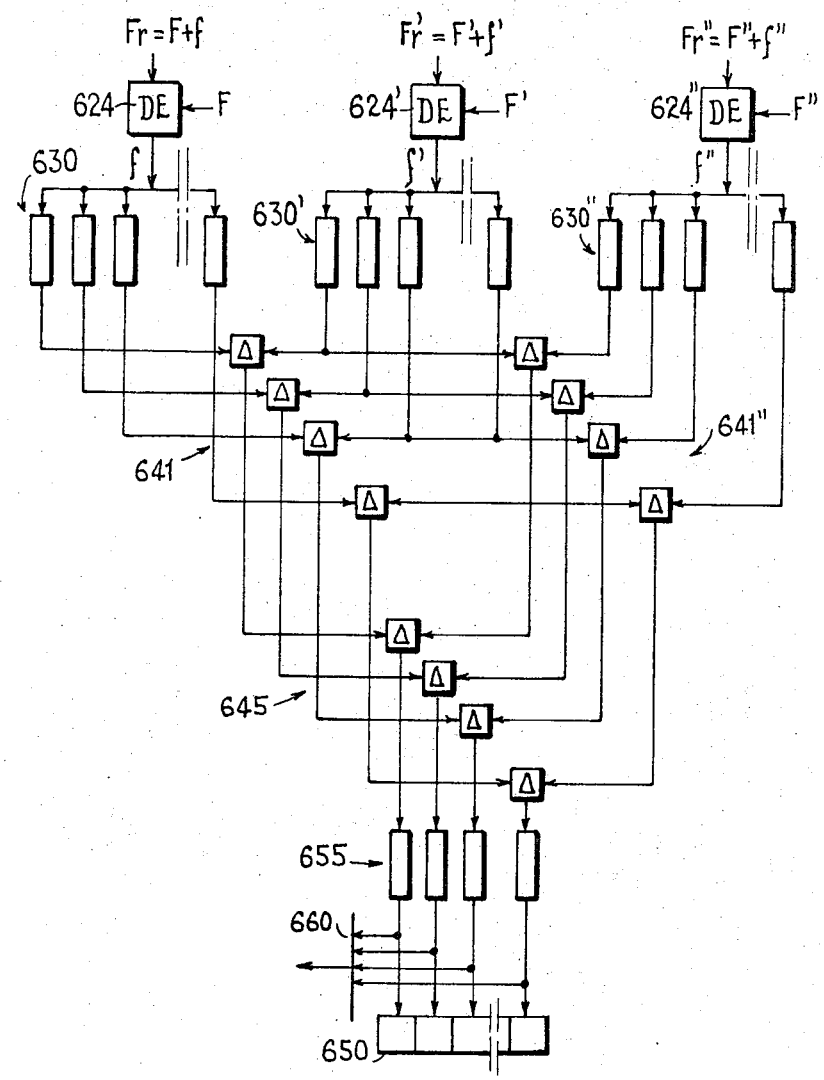
Figure 9:
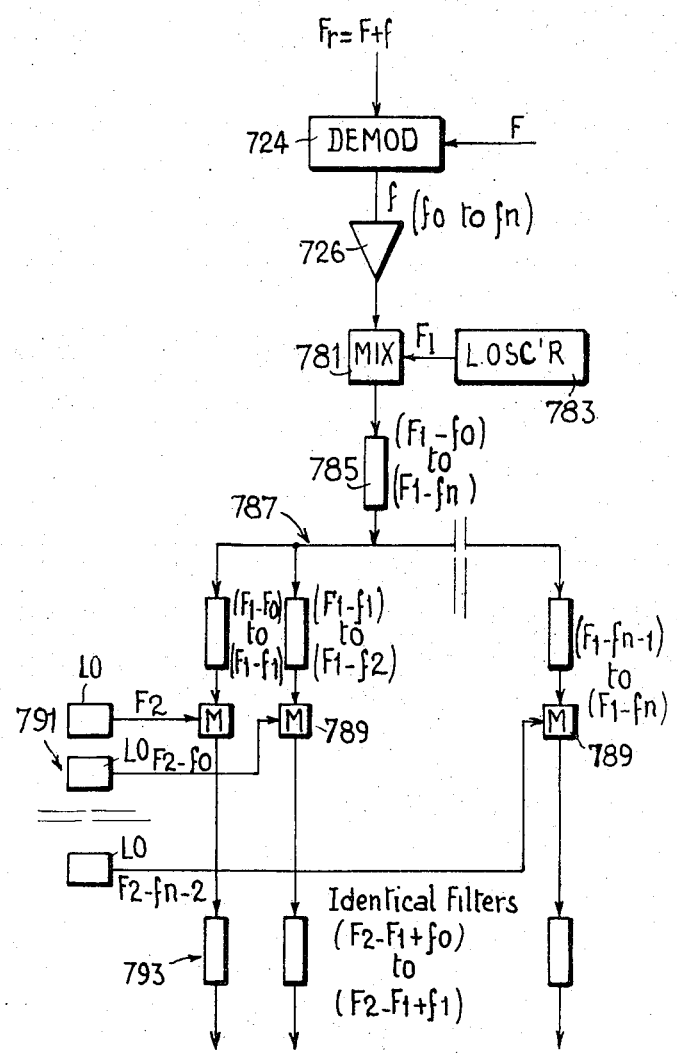

FIG. 8 similarly illustrates a proportionality-testing network for the case of three transmission frequencies, further including a second-order filter bank; and FIG. 9 is a fragmentary diagram of one channel of a further modification of a frequency-analyzing network according to the invention, using frequency changing means.

In the various embodiments, components corresponding in function are as far as feasible designated by reference numbers wherein the two lowest digits are the same.

Figure 1:
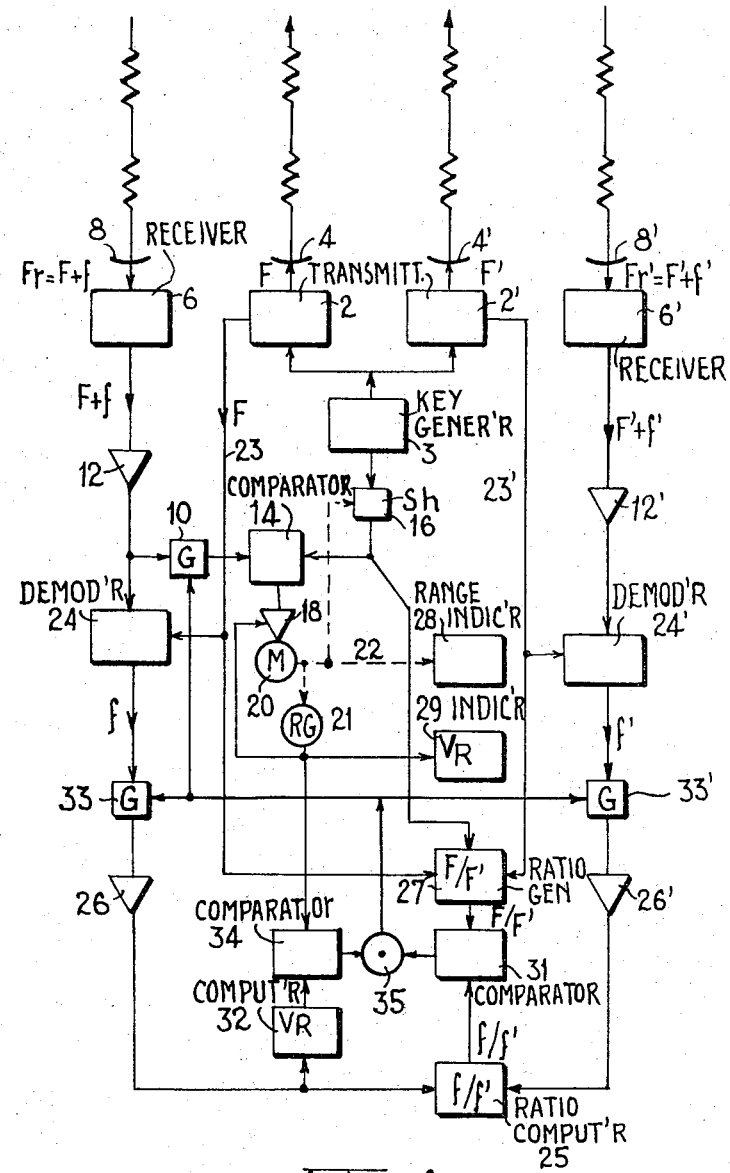
FIG. 1 is a block diagram of a radar system according to an embodiment of the invention utilizing two different transmission frequencies, the system being of the range follow-up or tracking type, the means used to test the proportionality between the frequency shifts and transmission frequencies being in the form of an analog computer.

The system shown in FIG. 1 includes a conventional radar transmitter 2 provided with an antenna 4 for beaming pulses of radio energy a ta carrier frequency F and a pulse rate determined by a keying generator 3 having an output connected to the transmitter and another output connected to a variable pulse shifter 16. A receiver 6 associated with the transmitter is provided with an antenna 8, it being understood that the transmitter and receiver might use a common antenna and duplexer if desired.

Radar pulses beamed from transmitter antenna 4 strike a target (not shown), and the return or echo pulses produced by the target in response to the pulses striking it are received by the incoming antenna 8. The received pulses from the output of receiver 6 are passed to an amplifier 12, and the amplified pulses are passed by way of a gate 10 to one input of a comparator 14. The comparator 14 has its other input supplied with keying pulse from the output of the variable pulses shifter 16 which is fed with keying pulses from keying generator 3. The comparator 14 produces an output whenever the pulse trains applied to its two inputs are not synchronous. This output after amplification in an amplifier 18 energizes a servo-motor 20. The servomotor 20 operates a mechanical input of the variable pulse shifter 16, and at the same time drives an input shaft of a distance indicator 28.

Motor 20 simultaneously drives a rate generator 21 which develops a voltage proportional to the rate of motor rotation. This rate voltage operates a velocity indicator 29 to provide an indication of the target's radial velocity. The rate voltage is simultaneously applied negatively to an input of amplifier 18 to provide a conventional rate-feedback loop for stabilizing the motor operation.

The arrangement so far described, disregarding gate 10, constitutes a generally conventional radar tracker of the follow-up type and operates as follows:

So long as the target is a straightforward type of target which can do nothing but passively reflect from its surface the radar pulses beamed at it from transmitter antenna 4, then the reflected echo pulses are initially received at receiver 6 at times displaced from the times of the corresponding keying pulses from generator 3 by intervals proportional to target distance. The comparator 14 therefore produces an output voltage, causing servo-motor 20 to operate the pulse shifter 16 until the keying pulses applied to the second (right-hand) comparator input have been time-shifted or delayed to a corresponding extent, at which time the comparator output drops to zero. In so doing, servo-motor 20 operates indicator shaft 22 in proportion to target distance, providing the desired range indication, while simultaneously rate generator 21 operates indicator 29 in proportion to the target's radial velocity. Of course, instead of (or in addition to) the mechanical range indication referred to, an electrical range indication may be provided. Thus the electrical voltage output from comparator 14 may be applied to an electrode of a cathode-ray oscilloscope.

Recently, as noted above, there has been developed electronic equipment for use on aircraft, missiles and similar potential radar targets which is designed to impart misleading information to adverse radar and thus render detection and tracking of such targets difficult or impossible. One effective way of achieving this result is to equip the targets with a modified type of transponder beacon arrangement, which operates to receive any radar signals beamed at it and to re-transmit such signals with an arbitrary, fixed or variable delay, which will induce the originating radar into providing an erroneous distance indication. In addition, the beacon can be so designed that it alters the carrier frequency of the radar signals re-transmitted thereby by an arbitrary, fixed or variable amount, thereby inducing a radar provided with Doppler, shift, detecting means to yield an erroneous indication of the target's radial velocity.

The system illustrated in FIG. 1 includes means, now to be described, for deriving correct range and velocity indications even in the case of a target equipped with scrambling expedients of the kind just described.

As shown in FIG. 1, there is provided a second transmitter 2' having an antenna 4' and transmitting radar pulses at the same keying rate as the first transmitter 2 and as determined by the keying generator 3, but having a carrier frequency F' different from the carrier frequency F of the pulses produced by transmitter 2. Associated with transmitter 2' is a receiver 6' having an antenna 8', and the output of the receiver is applied to an amplifier 12'.

The amplified pulses from the first receiver 6, as produced by amplifier 12, are applied to one input of a conventional coherent demodulator 24, and the amplified second receiver pulses produced by amplifier 12' are applied to one input of a coherent demodulator 24'. Demodulators 24 and 24' have their second or demodulating inputs connected by lines 23 and 23' to outputs of the respective transmitters 2 and 2' so as to receive the signal frequencies F and F' respectively therefrom. As is well understood, in the case of any moving target of normal character, that is to say a target not equipped with the scrambler beacon means referred to above, the echo or response signals received by receiver 6 and applied to demodulator 24 have a carrier frequency $F_r = F + f_d$ that differs from the carrier frequency F of the transmitted pulses by an amount $f_d$ which constitutes the Doppler frequency shift due to the radial velocity component of the target relative to the radar. Similarly the signals applied from receiver 6' to demodulator 24' are at a carrier frequency $F_r' = F' + f_d'$. The respective Doppler shift components $f_d$ and $f_d'$ have the values $$f_d = \frac{2v}{c} F \qquad f_d' = \frac{2v}{c} F' \qquad (1)$$

where $v$ is the radial velocity of the target relative to the radar and $c$ the velocity of electromagnetic waves.

The demodulators 24 and 24' therefore produce output signals at the respective frequencies $f_d$ and $f_d'$, the respective Doppler-component frequencies. These outputs from the demodulators are passed through gates 33 and 33' and, after further amplification in amplifiers 26 and 26', are applied to respective inputs of a frequency-ratio computer 25, which is of the type operating to emit an output signal proportional to the ratio of the signal frequencies applied to its respective inputs. For example, computer 25 may operate first to convert the A-C pulses applied to its inputs into D-C pulses of voltage levels proportional to the frequencies on the input pulses, and then to derive an output voltage proportional to the ratio of said voltage levels by well-known analog techniques.

A voltage-pulse generator 27 is supplied by way of variable pulse shifter 16 with pulses from keying generator 3 and generates voltage pulses proportional in amplitude to the fixed transmission-frequency ratio $F/F'$. Thus, when the system is on track, the output from generator 27, a measure of the ratio $F/F'$, appears substantially simultaneously with the appearance of the output from computer 25, a measure of ratio $f/f'$.

As here shown, the generator (or $F/F'$-ratio computer) 27 has the lines 23 and 23' connected to respective inputs thereof for introducing the frequency values F and F' thereto. Alternatively, however, generator 27 may be provided with a simple voltage control for directly presetting therein a voltage value corresponding to the frequency ratio $F/F'$.

The two voltage outputs from ratio computers 25 and 27 are applied to the inputs of a comparator 31, which acts to produce predetermined signal condition at its output when the two voltage signals applied to its inputs represent equal ratios, and another output signal condition when the input voltage signals represent unequal ratios. Thus, comparator 31 may operate to produce an output voltage signal when, and only when, said input voltage signals differ by less than a prescribed amount.

The amplified demodulated shift-frequency signal from amplifier 26 (or, alternatively, the shift-frequency signal from amplifier 26') is passed to a computer 32 which develops at its output a voltage proportional to said shift frequency and hence a measure of the target's radial velocity as derived from the Doppler shift. This voltage is applied to one input of a voltage comparator 34 whose other input is connected to the output of rate generator 21 so as to receive a voltage which is a measure of the target's radial velocity as derived from the range indication. Comparator 34, in this example, develops an output voltage when and only when the voltages applied to its two inputs differ by less than a prescribed amount. The outputs of the two comparators 31 and 34 are applied to respective inputs of an AND-gate or coincidence circuit 35 which produces an output voltage when and only when both of its inputs are energized. The output of circuit 35 is applied to the control inputs of gate 10 and gates 33 and 33', so as to maintain all three gates in open condition when, and only when, comparator 31 indicates substantial equality between the ratios $F/F'$ and $f/f'$ and comparator 34 indicates substantial agreement between the velocity indications derived from Doppler shift and from the time variation of target distance.

The system operates as follows:

It is first assumed that the target being tracked is of a normal or passive character, i.e. is equipped neither with (a) means for deceptively altering the frequency of radar pulses received and retransmitted by it, nor with (b) means for deceptively and randomly retarding such radar pulses.

Because of the absence of the first deceiving means (a), the respective frequencies $f$ and $f'$ passed by the demodulators 24 and 24' to the inputs of first frequency-ratio computer 25 are the true Doppler-shift frequencies $f_d$ and $f_d'$ corresponding to the target's actual radial velocity $v$, as given by Equations 1. Since the radial velocity $v$ is the same in both cases it is clear from Equations 1 that the two frequencies $f$ and $f'$ applied to the inputs of first ratio computer 25 are related by the equation $f/f' = F/F'$. In such case the comparator 31 will receive equal-valued signals at its inputs and will emit an output signal to the corresponding input of AND-circuit 35.

Because of the absence of the second deceiving means (b), the target-velocity indication derived by computer 32 from the Doppler-shift frequency is the same as the target-velocity indication derived from gate generator 21 as the time derivative of target range. Hence the comparator 34 will emit an output signal to its assigned input of AND-circuit 35.

AND-gate 35 therefore emits an output signal which opens all three gates 10, 33 and 33', permitting continued energization of range and velocity indicating means and of the testing means of the invention.

If however the signals $F_r$ and $F_r'$ returned from the target to the receivers 6 and 6' have been changed in frequency relative to the frequencies of the transmitted signals through the action of frequency-scrambling beaconry provided on the target (the deceptive means designated as "a" above), then the frequencies $f$, $f'$ delivered by the demodulators 24, 24' differ from the true Doppler-shift components $f_d$, $f_d'$ caused by the target's radial velocity alone. The likelihood that the arbitrarily changed frequencies will be related to each other in the same ratio ($F/F'$) as are the Doppler-shift-component frequencies according to Equations 1 is very small, as will be more fully shown by an analysis hereinafter. Consequently the signals from the $f/f'$-ratio computer 25 to the corresponding input of comparator 31 will differ from the signal applied from the $F/F'$-ratio computer or generator 27 to its comparator input, and comparator 31 will not produce the output signal condition required to energize the AND-network 35 in order to keep gates 10, 33 and 33' open. Closure of the gates suspends the operation of the system, preventing erroneous range and velocity indications.

Similarly, should the radar pulses returned from the target be arbitrarily and randomly shifted in time through the operation of a time-shift-deception beacon on the target (type "b" deception as referred to above), without a simultaneous shift in frequency, then the velocity indication derived from the Doppler shift by computer 32 will not agree with the velocity indication derived from range by generator 21 and comparator 34 will not produce an energizing signal for AND-network 35 to keep the gates 10, 33 and 33' open, so that the range and velocity indications are again suspended. It may here be noted that should the target be equipped with a deception beacon acting merely to retransmit the radar pulses with a constant time lag, conventional means are available to penetrate the deception, as by retaining only the first response signal and/or randomly altering the radar-pulse-repetition rate used.

Figure 2:
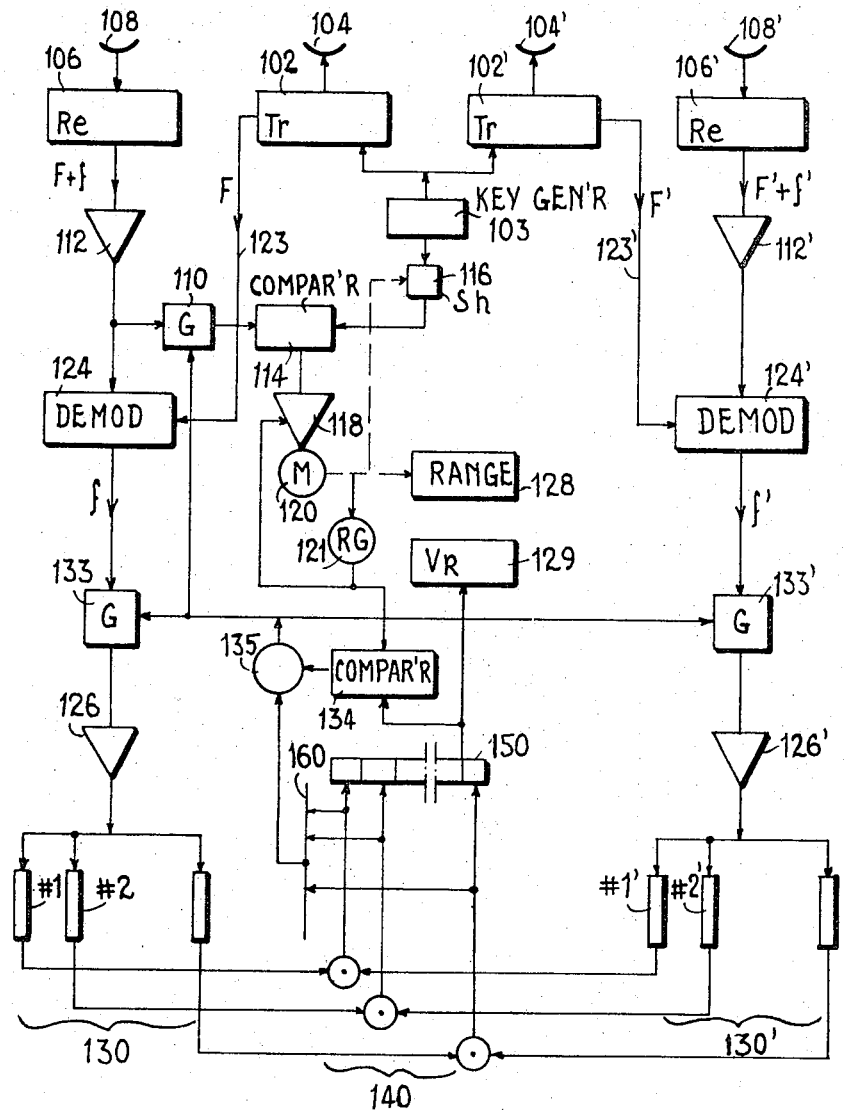
FIG. 2 shows another embodiment wherein the proportionality-testing means uses filter banks according to a preferred feature of the invention.

FIG. 2 illustrates an embodiment of the invention which differs from the one just described in the means used to compare the ratio of the received demodulated frequency components ($f/f'$) with the ratio of the transmission frequencies ($F/F'$). The comparison, rather than being performed by analog means as in FIG. 1, involves the use of frequency-analyzer filter networks which are especially suitable for use with digital equipment. In FIG. 2, parts similar to parts in FIG. 1 are designated by the same reference numerals plus one hundred and will not be described anew.

The outputs from amplifiers 126, 126', which are the demodulated frequency components $f$ and $f'$, are applied to respective banks of bandpass filters in parallel, the banks being generally designated 130 and 130'.

While only three filters are shown in each bank, their actual number is considerably greater, such as one or several hundreds. In each bank, the filters have narrow contiguous or somewhat overlapping frequency bands whose central frequencies are uniformly displaced so that the whole series of said narrow overlapping bands covers the range of Doppler frequencies corresponding to the velocities that can be reasonably expected from any target that may have to be tracked. Furthermore, the central frequencies of filters of corresponding numerical rank in the respective banks are selected to differ in the same ratio for all of the ranks, this common ratio being equal to the ratio $F/F'$ of the carrier frequencies of the signal from transmitters 102 and 102'. In other words, if f1, f2, f3, f4 etc. are the central frequencies of the respective filters such as #1, #2 ... of bank 130, and f1', f2', f3', f4' etc. are the central frequencies of the corresponding filters #1', #2' ... of the bank 130', the following relationships obtain:

$$f1/f1' = f2/f2' = f3/f3' = F/F'  \quad (1')$$

The filters of corresponding numerical rank in the two sets have their outputs connected to respective inputs of a common coincidence gate or AND-circuit, the set of these gates being generally designated 140. The outputs from the AND-circuits 140 are applied as inputs to a velocity-selector device 150, which may be of any desired type capable of providing a selective indication on its output line, e.g. in the form of a particular voltage level, depending on the particular AND-gate 140 that is energized. The output of selector device 150 operates radial-velocity indicator 129 to indicate the target's velocity, and is also applied to one input of comparator 134 whose other input is connected to the output of rate generator 121 as in the first-described embodiment.

The system operates as follows:

If the target is of a normal or passive character not equipped with frequency-changing beacon means, then the respective frequencies $f$ and $f'$ passed by the demodulators 124 and 124' to the filter banks 130 and 130' are the normal Doppler frequencies $f_d$ and $f_d'$ corresponding to the target's radial velocity $v$, as given by Equations 1. Since the radial velocity $v$ is the same in both cases, it is clear from Equation 1 that the two frequencies applied to the filter banks 130 and 130' are related by the equation $f_d/f_d' = F/F'$. If therefore the frequency $f_d$ applied to filter bank set 130 is of such value that it is passed, say, by the initial filter #1 of this set, then, in view of the above-indicated relationship provided between the central frequencies of corresponding filters in both banks, it is evident that the frequency $f_d'$ applied to bank 130' will be passed by the corresponding-rank filter #1' of this bank. In such a case, therefore, corresponding outputs of the respective banks 130 and 130' will be energized, and the corresponding one of the gates 140 will have an effective output. This output is applied to the velocity selector device 150 to provide an indication of the target's radial velocity on indicator 129 as explained above. At the same time, the output from the energized gate 140 is applied by way of OR-gate 160 to energize one input of the coincidence circuit 135. The velocity-selective output (e.g. voltage level) from device 150 is also applied to one input of comparator 134 whose other input is connected to the output of rate generator 121. If the Doppler-derived and range-derived velocity indications tally, comparator 134 produces an output which energizes the second input of AND-circuit 135, permitting continued operation of the range and velocity indicating means as described in the first embodiment.

If the response signals that are returned from the target to the receivers 106 and 106' have been changed in frequency relative to the frequency of the related transmitted signals through the action of frequency-scrambling beaconary provided on the target, then the shift frequencies $f$ and $f'$ delivered by the demodulators 124, 124' differ from the true Doppler-shift frequencies $f_d$ and $f_d'$. The likelihood that the arbitrarily manipulated shift frequencies $f$ and $f'$ will be related to each other in the same ratio $(F/F')$ as are the Doppler-shift frequencies $f_d$ and $f_d'$ according to Equations 1 is very low. Consequently the signals from demodulators 124 and 124' applied through amplifiers 126 and 126' to the filter banks 130 and 130' will generally be passed through non-corresponding filters of the respective banks. In such case none of the coincidence gates 140 is energized and the velocity selector 150 will not be actuated. Moreover, no actuating signal is then applied through OR-gate 160 to coincide circuit 135 so that gates 110, 133, 133' are closed. The application of range signals to comparator 114 is then discontinued, preventing erroneous distance indications from being given. Furthermore, if the response signals from the target have been deceptively (and randomly) shifted in time only, coincidence circuit 135 produces no energizing output and gates 110, 133, 133' are similarly closed.

It will thus be seen that the system of the invention will derive indications relating to target range and velocity only from the true Doppler-shift components of the response signals returned from the target. Indications from signals of other frequencies capable of causing erroneous readings, and primarily signals that have been frequency-shifted with the deliberate intent of yielding misleading indications, will not be allowed to appear. Misleading distance indications caused by deceptive random time shift of the radar pulses are likewise suppressed.

In many cases the response signals received from a moving target may include both true and spurious Doppler-shift components simultaneously. In such cases the system of the invention will discriminate between the two kinds of shift components and provide indications in response only to the true Doppler shifts, as will be evident from the above.

Figure 3:
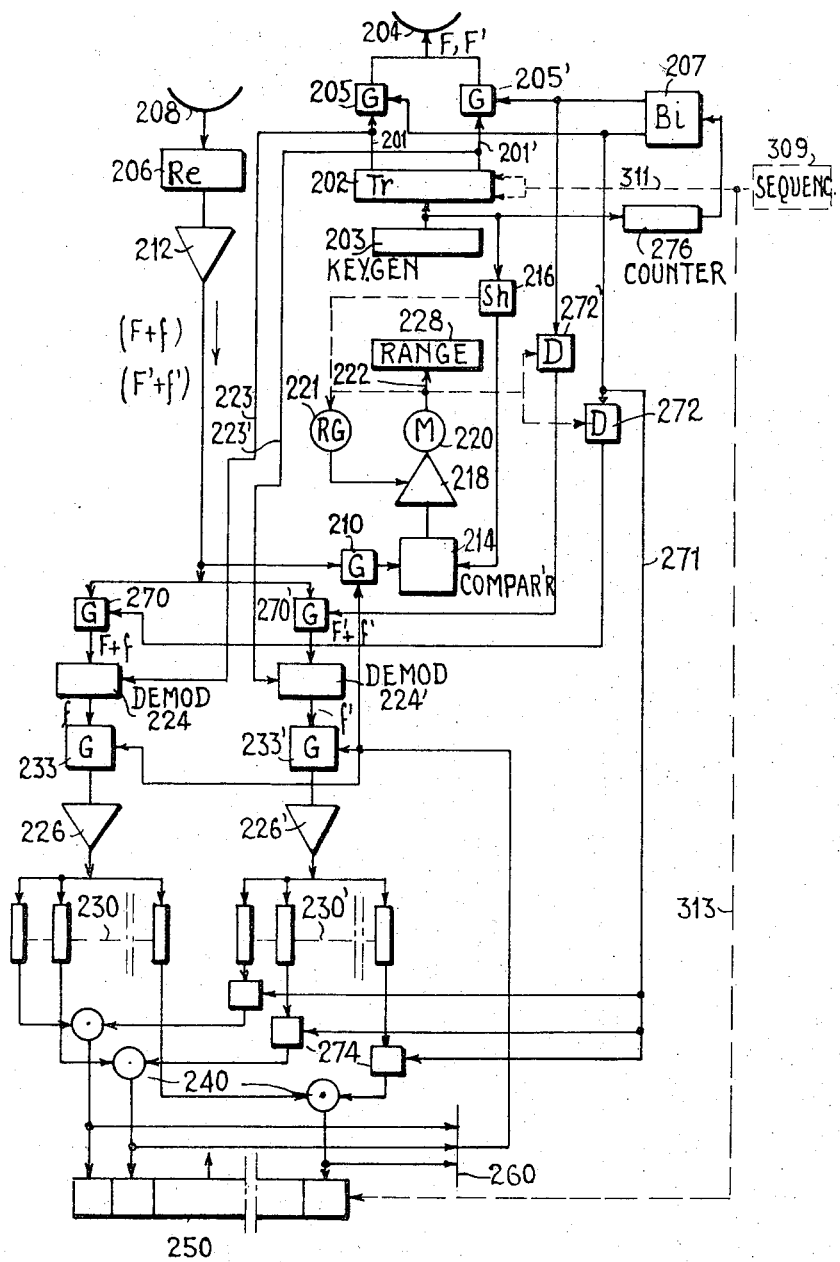
FIG. 3 shows an embodiment generally similar to that of FIG. 2, but wherein the two pulsed signals of different frequency are transmitted in the form of intersperced pulse trains from a common transmitter and are received by a common receiver, rather than using separate transmitters and receivers as in the first two embodiments.

The system illustrated in FIG. 3 as another exemplary embodiment of the invention includes but a single transmitter 202 and associated receiver 206. Transmitter 202 is of a conventional duel-frequency type adapted to deliver pulses at two different carrier frequencies F and F' over the two output lines 201 and 201' both leading to the common transmitter antenna 204 by way of respective gates 205, 205'. The gates 205, 205' are actuated to open condition by the respective outputs of a binary element or bistable circuit 207 having an input actuated from a pulse counter 276 supplied with keying pulses from keying generator 203.

It will be seen that with this arrangement the pulses beamed from transmitter antenna 204 at the target will alternate in groups between the carrier frequencies F and F', the pulse number per group being determined by the setting of counter 276, and all the pulses being uniformly timed at the rate determined by keying generator 203.

The receiver 206 is adapted to receive the response signals at both carrier frequencies $F_r$ and $F_r'$, as beamed back from the target, and pass them by way of amplifier 212 and gate 210 to one input of comparator 214 receiving at its other input the phase-shifted keying pulses delivered thereto from generator 203 through variable pulse shifter 216. The amplified output of the comparator energizes servo-motor 220 which controls the variable pulse shifter 216 and simultaneously drives range-indicator shaft 222 and rate generator 221, all as in FIGS. 1 and 2.

The amplified response signal from amplifier 212 is, furthermore, passed through two gates 270 and 270' to respective demodulators 224 and 224'. The gates 270 and 270' are supplied at their control inputs with gate-opening signals delivered by variable delay devices or pulse shifters 272, 272', which are connected to receive the respective output levels from bistable element 207. The variable delay devices 272 and 272' are both operated from servo-motor 220 concurrently with the operation thereby of pulse shifter 216. It will thus be apparent that with the radar locked on a target and servo-motor 220 being consequently operated in accordance with target distance, delay device 272 will operate to open gate 270 at times and for periods corresponding to the reception of the groups of $F_r$-frequency response pulses and devices 272' will operate to open gate 270' at times and for periods corresponding to the reception of the groups of $F_r'$-frequency return pulses.

The demodulators 224 and 224' have demodulating inputs applied to them through lines 223, 223' from the lines 201 and 201' respectively. Hence, the demodulated outputs from circuits 224 and 224' will normally represent the Doppler-frequency components $f_d$ and $f_d'$ relating to the pulse groups at frequencies F and $F_2$ respectively. These demodulated outputs, through gates 233, 233' and after amplification in elements 226, 226', are applied to the banks of parallel filters 230, 230' having frequency characteristics predetermined in the same way as described with reference to FIG. 2.

The outputs from all the filters of one set, herein set 230', are passed through respective delay or memory circuits, generally designated 274, wherein said outputs are stored for a time corresponding to the cyclic time displacement between the alternating groups of pulses at transmission frequencies F and F'. The storage devices 274 are shown as having clearing controls actuated through a line 271 from that output of bistable circuit 207 which opens the F-frequency transmission gate 205. The outputs from the delay or storage devices 274 are applied to associated inputs of respective AND-circuits 240 whose other inputs are directly connected to the outputs of the correspondingly numbered filters of the other bank 230. The outputs from the AND-circuits are applied to the velocity selector device 250 and by way of OR-circuit 260 to gates 210, 233 and 233'. It will be understood that whereas FIG. 3 does not show either the radial-velocity indicator means or the means for comparing the radial-velocity indications as derived respectively from the range-tracking circuitry and from the Doppler circuitry, such means may be provided in a manner similar to that described and shown with reference to FIG. 2.

The operation of this system will be evident in the light of the explanations earlier given. Gates 270 and 270' open in time with the reception of the pulse groups at the two different response frequencies $F_r$ and $F_r'$ to pass those pulses for demodulation in the respective demodulators 224, 224'. The demodulated signals are normally applied through gates 233, 233' to the filter banks 230, 230'. The output from a particular one of the filters of bank 230 derived from a received pulse group at frequency $F_r'$ is stored in a respective one of the storage devices 274 and presented to an AND-circuit 240 simultaneously with the presentation to an AND-circuit 240 of the output from a filter bank 230, derived from the precedingly received pulse group at frequency $F_r$. If the two filter outputs are simultaneously presented to a common AND-gate 240, this means that the filter outputs represent true Doppler components $f_d$, $f_d'$. The AND-circuit 240 thus energized at both of its inputs energizes a corresponding input of velocity selector 250 to produce a corresponding radial-velocity indication (through means not shown in FIG. 3), and simultaneously acts through OR-circuit 240 to maintain gates 210, 233, 233' open for continued indication of target range. Spurious frequency components such as those that may be produced by a scrambling beacon are passed to different AND-circuits 240 and do not produce any output, thus suspending range indication.

It will be noted that the system just described with reference to FIG. 3, in addition to reducing the amount of equipment required, has a further advantage over the embodiment of FIG. 2 in that it makes all of the transmitted radar energy available for operating the range-indicating section of the system.

Figure 4:
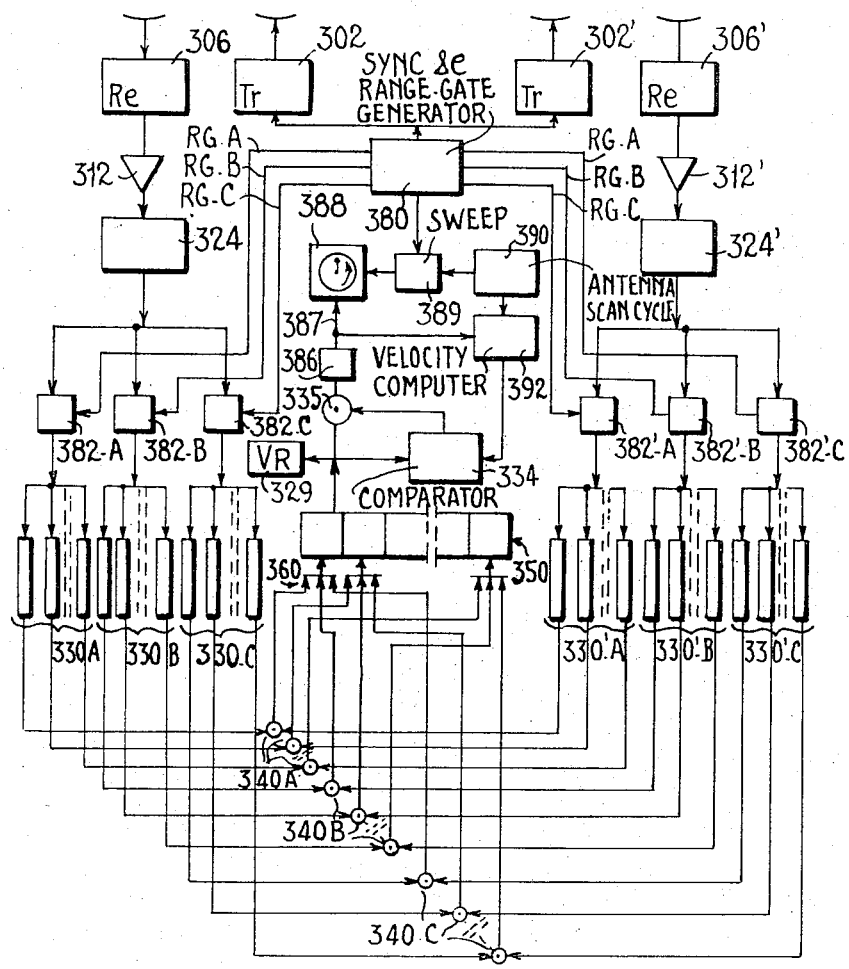
FIG. 4 shows an embodiment in the form of a search radar of the type capable of detecting a plurality of targets in a series of distance ranges.

Whereas the embodiments so far described all related to tracking radar systems, FIG. 4 presents an embodiment of the invention which constitutes a search radar, more specifically one of the monitoring type incorporating a plurality of range gates for covering the total distance range of the system.

The search radar shown in FIG. 4 includes the transmitters 302, 302' transmitting pulses at carrier frequencies F, F', and the associated respective receivers 306, 306'. A synchronizer and range-gate generator 380 serves to produce synchronized keying pulses for keying the transmission of both transmitters 302, 302'. Generator 380 likewise generates range-gate pulses over the range-gate lines RG–A, RG–B, RG–C. The range-gate pulses may be timed to alternate in a cyclically repetitive sequence so that each pulse corresponds in timing and duration with a paticular, partial range of target distances. This general mode of operation is well understood in radar work and need not be described in greater detail. While only three range gates are here shown for simplicity, a greater number may of course be provided.

As in the preceding embodiments, the radar signals at frequency $F+f$ (or $F'+f'$) as received by receiver 306 (306') are amplified in element 312 (312') and demodulated in element 324 (324') with the corresponding carrier frequency F (F'): the demodulated frequency components $f$ ($f'$) may if desired be reeamplified in further amplifiers, not here shown. In each of the two reception channels, the demodulated frequency components from demodulator 324 (or 324') are applied in parallel to a number of filter banks, one for each of the range gates used, i.e. herein three parallel filter banks, designated 330–A, 330–B, 330–C (330'–A, 330'–B, 330'–C), by way of respective coincidence gates 382–A, 382–B, 382–C (382'–A, 382'–B, 382'–C). The three coincidence gates in each channel have their control inputs supplied with range-gate pulses from the range-gate lines RG–A, RG–B, RG–C respectively, as shown. Thus, during the range-gate-pulse period RG–A, the demodulated signals in the respective reception channels are passed through gates 382–A and 382'–A to the filter banks 330–A and 330'–A, during range-gate-pulse period RG–B said signals are passed through gates 382–B and 382'–B to filter banks 330–B and 330'–B, and during period RG–C the signals are passed through gates 382–C and 382'–C to filter banks 330–C and 330'–C. The filter banks in each reception channel may be similar, and the frequency characteristics of the filter banks in the respective channels may be related in the same manner as described for the previous embodiments.

The outputs from corresponding filters in corresponding banks in the two channels are applied to respective inputs of associated AND-circuits which constitute three sets 340–A, 340–B, 340–C, one for each of the range gates used. Corresponding AND-gates in all the sets 340–A, 340–B and 340–C have their outputs combined in a corresponding OR-circuit 360 and the OR-circuit outputs are applied to respective inputs of a velocity-selector 350 which emits at its output a selective velocity signal (e.g. voltage level) depending on which of its inputs (if any) has been energized. The output of velocity selector 350 is shown as operating a radial-velocity indicator 329.

The output of selector 350 is also applied by way of an AND-circuit or coincidence gate 335 and a pulse shaper 386 to the control or Wehnelt-grid input 387 of a C.R.T. indicator 388. The C.R.T. indicator has an electron-beam-sweep control system schematically indicated by the block 389 as having an input connected to the sync and range-gate generator 380 and another input connected to an antenna-scan-cycle control unit 390. This represents a generally conventional sweep-cotrol arrangement for a radar C.R.T. indicator, wherein the deflector-electrode system of the C.R.T. is operated to impart to the electron beam a circular sweep cycle around the cathode-ray-tube screen synchronous with the radar-antenna sweep cycle, and a radial sweep across the screen synchronous with the scanning of the range gates in the range-gate generator 380. The system so far described operates as follows:

Let us assume the radar has detected a target located within the distance bracket corresponding to range gate RG–A. The resulting echo pulse at frequency $F+f$ as received by receiver 306 is demodulated in 324 and the demodulated frequency component $f$ is applied by way of gate 382–A to the filter bank 330–A. Simultaneously the echo pulse at frequency $F'+f'$ as received by receiver 306' is demodulated and the demodulated frequency component $f'$ is applied by way of gate 302'-A to the filter bank 330'-A. As earlier explained, if and only if the frequency components $f$ and $f'$ are true Doppler-shift components they will be passed by corresponding filters in the two banks and a corresponding one of the AND-circuits 340-A will have an energized output. Velocity selector 350 then produces a corresponding velocity voltage signal which is displayed on radial-velocity indicator 329. Moreover, the velocity selector 350 applies by way of AND-circuit 335 and pulse shaper 386 a voltage pulse to the control-grid input 387 of C.R.T. indicator 388. The function of AND-circuit 335 will be explained presently and it is assumed for the moment that this AND-circuit has its second input (from comparator 334) energized. Energization of the control grid of the C.R.T. indicator 388 causes a pip to appear on the indicator screen at an angular position thereon corresponding to the azimuth of the detected target (as determined by antenna-scan-cycle control 390), and at a radial position corresponding to the target range within the distance bracket or range gate (e.g. RG-A) being monitored. If the two demodulated frequency components $f$ and $f'$ were spurious Doppler shifts they would pass through non-corresponding filters in the two channels, none of the AND-circuits 340 would have an energized output and there would be no pip on the C.R.T. indicator screen.

Furthermore, as shown, the velocity signal from selector 350 is applied to one input of voltage comparator 334. The other input of the comparator receives the output of a velocity computer 392 which computes the target's velocity from the range indication. Computer 392 may for example, as shown, have a first input connected to the output of pulse former 386 to develop a first voltage proportional to the time displacement between the pips generated in consecutive scan cycles of the radar antenna, and may have a second input connected to the antenna-scan-control unit 390 to develop a second voltage proportional to the antenna-scan-cycle period, the computer 392 developing an output voltage representing the quotient of said second over said first voltage, as a measure of target velocity. The comparator 334 produces an output signal for energizing the second input of AND-circuit 335 when the two comparator inputs are in substantial agreement. Otherwise, i.e. if the velocity indications respectively derived from the Doppler shift and from range variation are discrepant, the comparator 334 produces no output, AND-circuit 335 is disabled and no pip appears on the C.R.T. screen, precluding erroneous range indication as a result of a deceptive random time shift in the signals retransmitted from a target beacon.

The anti-scramble protection afforded by the systems of the invention as so far described can be made more effective by simply increasing the number of filters in each of the filter banks used and correspondingly reducing the width of the pass band for each filter. The modification now to be described with reference to FIG. 5 makes it possible to achieve a considerably higher degree of protection while using a limited number of filters.

The two filter banks 430 and 430' shown in FIG. 5 may form part of a system which is otherwise similar in character to any of the embodiments earlier described with reference to FIGS. 2, 3 or 4. The outputs of corresponding filters of the two banks, instead of being applied to coincidence circuits as in the earlier embodiments, are applied to respective inputs of associated frequency-difference networks generally designated 441. Each of these networks is of a conventional type operating, on application to its respective inputs of pulses at different frequencies, to emit an output pulse whose frequency is the difference of the frequencies of the applied pulses. The outputs of the respective difference circuits 441 are pplied to the corresponding filters of a third filter bank 455.

The characteristics of the third frequency network 455 are selected so that the mid-frequency of each filter thereof equals the difference between the mid-frequencies of two filters of corresponding numerical rank in the banks 430 and 430'; moreover the bandwidth of each of these third filters 455 is substantially equal to the difference of the bandwidths of the corresponding filters in the first pair of banks 430, 430'. The outputs from the filters of bank 455 are applied to velocity selector 450 and OR-gate 460, which correspond in function to the similar components shown in FIGS. 2, 3 and 4.

In the operation of this embodiment, the energization of a difference gate 441 proves that the frequency-shift signals $f$ and $f'$ satisfy the equation $f/F=f'/F'$ (which characterizes true Dopple-shift frequencies), to within the approximation afforded by the bandwidths of the first-order filters of banks 430, 430'. In view of the non-negligible bandwidth of these filters, it can happen that the two signals have managed to pass through corresponding filters of said two banks even though the above equation is only approximately satisfied, as when one signal frequency lies close to the lower boundary of the pass band of a filter of one bank and the other signal frequency is close to the upper boundary of the pass band of the corresponding filter of the other bank. Such a pair of signals if applied to an AND-gate as in the embodiments of FIGS. 2, 3 and 4 might then result in an erroneous indication. However, the fact that the difference-frequency signal $(f'-f)$ produced by a difference circuit 441 succeeds in passing the associated filter of the second-order bank 455 proves that the signals additionally satisfy the relations $$\frac{f-f'}{F-F'}=\frac{f}{F}=\frac{f'}{F'}$$

to within the approximation provided by the bandwidth of the second-order filters 455, which is a considerably higher approximation in view of the much narrower bandwidth of these filters.

The following analysis and numerical example will help clarify the working and utility of the invention.

It is assumed the target is equipped with a scrambler beacon operating to retransmit radio energy of a frequency that is altered by a constant additive factor $h$ with respect to any frequency beamed at the target. A conventional Doppler radar transmitting at the single frequency F will then receive in return, assuming the target is traveling at a radial velocity $v$, energy at the frequency $$F_r=\left[F\left(1+\frac{v}{c}\right)+h\right]\left(1+\frac{v}{c}\right) \qquad (2)$$

Since both $h$ and $v$ are relatively small, we can disregard the second-order terms $v^2/c^2$ and $vh/c$ and rewrite this expression $$F_r=F\left(1+\frac{2v}{c}\right)+h \qquad (2')$$

The term $2v/c$ represents the Doppler-shift component due to the target's radial velocity.

After demodulation, a conventional system would derive a signal at the frequency $$f=\frac{2v}{c}F+h \qquad (3)$$

On the false assumption that this represents the true Doppler-frequency shift signal corresponding to the target's radial velocity, the system will indicate for said velocity an erroneous value $w$. This false velocity value w is obtained by applying the Doppler Equation 1 to Equation 2':

$$w = \frac{c}{2F}\left(\frac{2v}{c}F + h\right) = v + \frac{hc}{2F}$$

The velocity error is therefore $$\delta v = \frac{hc}{2F} \quad (4)$$

By way of example, assume the radar transmission frequency is $F = 10,000$ megacycles, and that the constant frequency change $h$ introduced by the target beacon is $h = 25$ kilocycles. The radar instrument will then at all times indicate a target radial velocity differing by $$\frac{25,000 \times 3 \times 10^8}{2 \times 10^{10}} = 375$$

meters per second from its actual radial velocity. It is obvious that a systematic error of this kind would play havoc with normal tracking operations.

Consider now a dual-frequency Doppler radar system according to the embodiment of the invention shown in FIGS. 2, 3 and 4, using the two transmission frequencies $F$ and $F'$, so that $F'/F = \alpha$, with $\alpha > 1$.

In the general situation assumed above, it is seen from the above Equation 3 that the signals applied from the respective demodulators 124 and 124' (FIG. 2) to the filter networks 130 and 130' will have the following frequencies respectively:

$$f = \frac{2v}{c}F + h$$

$$f' = \frac{2v}{c}F' + h \quad (5)$$

The expression for $f'$ can be rewritten as follows as a function of $f$:

$$f' = \alpha f - h(\alpha - 1) \quad (6)$$

Figure 6:
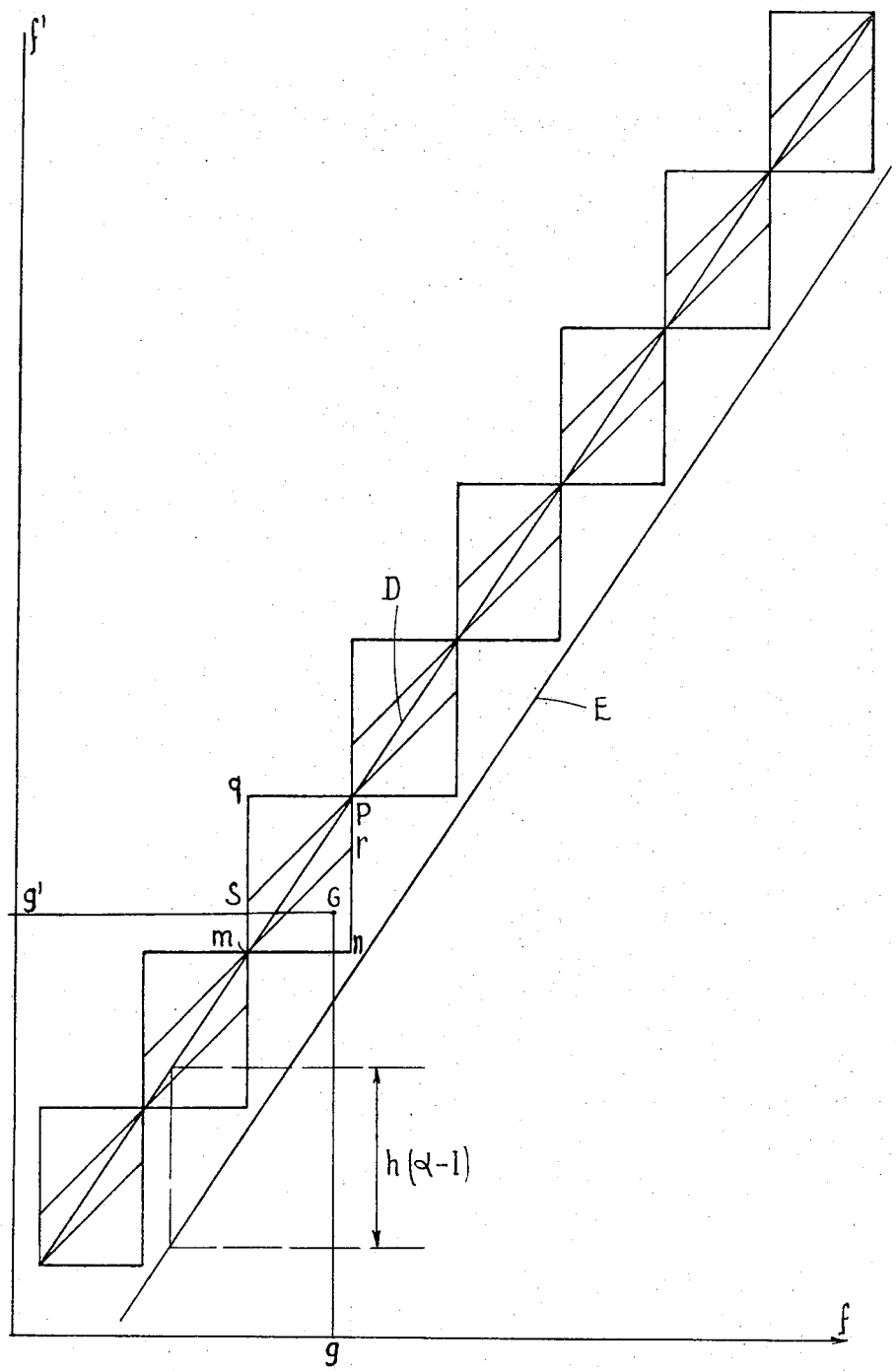
FIG. 6 is a chart explaining the operation of the filter-bank type of proportionality-testing device used according to the invention.

Reference will now be made to the chart of FIG. 6, in which the abscissae represent shift frequencies $f$ derived from the F-frequency transmitted signals and the ordinates represent shift frequencies $f'$ derived from F'-frequency transmitted signals. If the greatest target radial velocity to be detected is $v_m$, then it is seen from Equation 1 that the greatest value of the abscissae is $$f_m = \frac{2v_m}{c}F \quad (7)$$

and the greatest ordinate value is $$f_m' = \frac{2v_m}{c}F' = \frac{2v_m}{c}F\alpha \quad (8)$$

The diagonal line D represents the line correlating the true Doppler-shift-frequency signals received from any target. This means that for any shift-signal frequency $f$ applied to the first filter network 130 (FIG. 2), if this signal is a true Doppler-shift signal indicative of an actual target velocity, the shift-signal frequency $f'$ concurrently introduced into the other filter network 130' must equal the ordinate of the point on line D whose abscissa is the frequency $f$. The slope of this line is $\alpha$, which is shown as 3/2 on the chart.

The rectangles on the chart, such as rectangle $mnpq$, represent the area of effectiveness of any pair of corresponding filters (i.e. filters of equal numerical rank) in the respective banks 130 and 130'. Thus, any two signal frequencies concurrently applied to the two filter banks will be passed by corresponding filters of the respective bank, and will therefore produce an output signal from the system, if such two frequencies represent the abscissa and the ordinate, respectively, of a point situated within one of said rectangles; otherwise the system will produce no output. For instance, two concurrent signals having the frequencies $g$ and $g'$ (see FIG. 6) would be passed by the system since the corresponding point G lies within a rectangle, even though the two signals do not represent true Doppler signals indicative of an actual target velocity (since point G is not on line D).

Line E represents a line correlating pairs of frequency shifts deriving from response signal retransmitted from a target equipped with a scrambler beacon, of the type described above, which operates to change the frequency beamed at it by a constant additive term $h$. The equation representing line E is Equation 6 above, and it is seen that line E has the same slope ($\alpha$) as line D but is displaced from it by the amount $h(\alpha-1)$ towards the negative ordinates.

It is clear from the geometry of the chart that if the system is to be free from error when dealing with this target, the line E must lie wholly outside the areas of all the rectangles such as $mnpq$ and the following inequation must therefore be verified:

$$h(\alpha - 1) > \frac{f_m'}{N}$$

where N is the total number of filters used per set. This condition, bearing in mind Equation 4 and 8, can be written $$N > \frac{\alpha}{\alpha - 1}\frac{v_m}{\delta v} \quad (9)$$

This last inequation states the minimum number of filters to be used in each of the two networks in an embodiment of the invention such as that shown in FIGS. 2, 3 or 4, in order to ensure that the resulting system will not be liable to target-velocity errors greater than $\delta v$.

Figure 5:
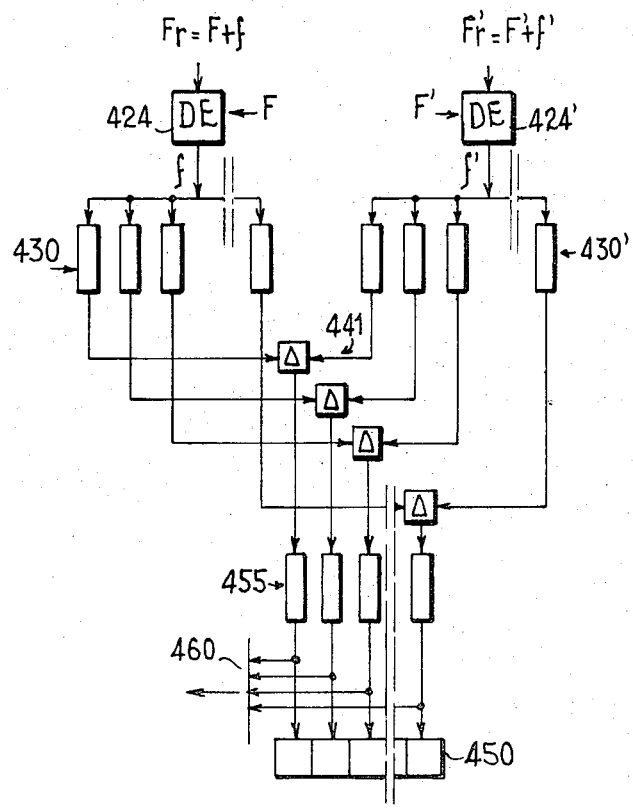
FIG. 5 is a partial diagram illustrating a modified form of proportionality-testing network utilizing a second-order filter bank.

The parallelograms, such as $mrps$, on the chart represent the areas of effectiveness of any correlated triplet of filters in the three filter networks provided in an embodiment of the type shown in FIG. 5. If a pair of concurrent frequency-shift signals have passed through corresponding filters of the primary two networks 330 and 330', the representative point for this pair of signals lies within a rectangle $mnqp$ as explained above. If further said two signals pass through the corresponding filter of the secondary network 355, the representative point lies within the parallelogram $mrps$ associated with that rectangle. The inner area of this parallelogram is the locus of all those points in the rectangle whose abscissa and ordinate differ by less than the amount the long and short sides of the rectangle differ. The length of a vertical side of such a parallelogram is $$\overline{pr} = \frac{\alpha - 1}{\alpha}\overline{pn}$$

It is easily inferred that in this embodiment the condition that the system shall be free from velocity errors greater than $\delta v$ is that each of the three filter networks contains a number of filters such that $$N > \frac{v_m}{\delta v} \quad (10)$$

*Numerical example*

In a prototype system constructed in accordance with the embodiment disclosed in FIG. 2, the transmitters 102 and 102' transmit radar pulses at the frequencies $F = 10,000$ mc. and $F' = 11,000$ mc., whence $$\alpha = F'/F = 1.1$$

The keying rate used is 10,000 p.p.s.

The filter network 130 consists of $N = 200$ filters of 50 cycles bandwidth each, and network 130' consists of $N' = 182$ filters of 55 cycles bandwidth each. It will be noted from this example that the filter banks used according to the invention do not necessarily comprise equal numbers of filters, and indeed it is often desirable to use different numbers of filters covering equal total Doppler-frequency ranges to preclude ambiguities resulting from sub-harmonic frequencies. In this case the total Doppler range covered is from 0 to $f_m=10,000$ cycles.

From Equation 7 it is seen that the system can handle target velocities up to $$v_m = c\frac{f_m}{2F} = 150$$

meters per second. This is the maximum target radial velocity possible without range ambiguity. Higher target velocities can be handled provided conventional range-ambiguity-removal means are used, as is well known in the art.

Inequality 9 shows that the maximum velocity error $\delta v$ which the system will allow is about $$\delta v = \frac{\alpha}{\alpha-1}\frac{v_m}{N} = \frac{1.1}{0.1}\frac{150}{182} = 9$$

meters per second.

The same system, modified to include a third filter bank in accordance with the embodiment of FIG. 5, would permit a maximum velocity error, as indicated by Inequation 10, of only 150/182 or less than one meter per second.

The filters used in the filter networks of the invention can assume any of various forms as used in conventional bandpass filters, including simple LC filters, and may if desired be provided with associated crystal circuits. RC filters may also be used and are especially desirable in view of their high capability for miniaturization. In this connection, it is found convenient to include selective local oscillators to change the frequencies of the components passed through the individual filter channels of the frequency-analyzer networks used according to the invention, whereby the final comparison may be effected as between the outputs of banks of identical filters, conveniently of the R–C type. Such a modification is fragmentarily illustrated in FIG. 9.

As shown in FIG. 9, a received signal $F_r$ in one of the two or more reception channels of a system according to the invention is demodulated in demodulator 724 and the demodulated frequency component ($f$) is amplified in element 726. This demodulated frequency $f$ covers a Doppler range from $f_0$ to $f_n$, for example from $f_0=3$ kilocycles to $f_n=30$ kilocycles, corresponding to a maximum target velocity of 450 meters per second. The $f$-frequency is passed through a mixer 781 in which it is mixed with an intermediate frequency $F_1$ from a local oscillator 783, e.g. $F_1=70$ kc. The output from mixer 781 thus covers a frequency band from $(F_1-f_0)$ to $(F_1-f_n)$, i.e. from 67 kc. to 40 kc. in the present example, and is passed through a bandpass filter 785 of corresponding bandwidth. The filtered output from the mixer is then passed through a set of filters 787 in parallel so as to subdivide it into a number of elementary frequency bands having the relative values indicated on the figure. The output from each filter of bank 787 is then passed through a respective one of a corresponding series of mixers 789 in which it is mixed with a suitable frequency from a respective one of a set of local oscillators 791, having the indicated relative frequency values. In the example under consideration, the second intermediate frequency $F_2$ used in this set of local oscillators 791, may be 80 kc. It will be apparent that with the indicated values the outputs from mixers 789 all comprise identical frequency bands (herein 13 kc. to 16 kc.), and said outputs are accordingly passed through a bank of identical filters 793. Preferably, the outputs from filters 793 are subjected to an additional frequency-changing stage, from a further set of local oscillators, not shown, whereby to provide outputs through a set of identical narrow filters of e.g. 200 c.p.s. bandwidth, which filters are conveniently of the R–C type. Such an additional frequency-changing stage, although not here shown for simplicity, would generally be found necessary in order to ensure that all the Doppler-shift components are properly presented in their correct sequence at the output of the network while eliminating image-frequency components.

Figure 7:
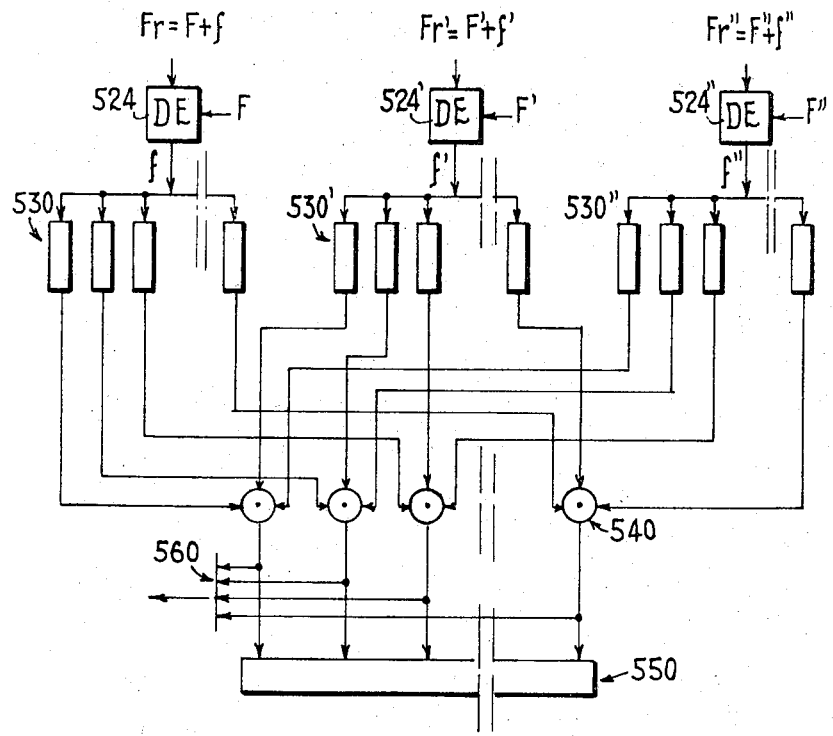
FIG. 7 is a partial diagram illustrating a proportionality-testing filter network in the case of a radar system according to the invention using three, rather than two, different transmission frequencies.

In the embodiments so far disclosed, the invention utilizes two different transmission frequencies (F and F'), but more than two may be used if desired. FIGS. 7 and 8 partly illustrate radar systems according to the invention in which three different transmission frequencies are used in order to achieve yet greater precision in the test for correlation between the frequency shifts of the associated response signals and thereby ensure fuller protection against spurious Doppler signals.

In the embodiment shown in FIG. 7, there are provided three filter banks 530, 530', 530'', each supplied in parallel from an associated demodulator 524, 524', 524''. Each demodulator receives at its one (demodulating) input a frequency signal F, F' or F'' from an associated radar transmitter (or transmission channel), not shown, and receives at its other ("demoduland") input the respective response signal at the frequency $F_r$, $F_r'$ or $F_r''$, from a corresponding receiver (or receiver channel), not shown. The demodulated outputs are the shift-frequency signals $f$, $f'$, $f''$, and are applied to the respective filter banks.

In each filter band 530, 530', 530'', the filters have contiguous, somewhat overlapping, frequency pass bands which cover substantially the full range of Doppler-shift frequencies indicative of the target velocities to be reasonably expected. The center frequencies of corresponding filters in the three banks are proportional to F, F' and F'' respectively. The outputs of each triplet of corresponding filters in the three banks are applied to a respective one of a set of three-input coincidence gates 540. The outputs from the respective gates 540 are applied to a radial-velocity selector 550 and to an OR-gate 560, the output of which may serve to block the path of the response signal to the range-indicating instrumentation, as shown in FIGS. 2–4.

It will be understood from previous explanations that the presence of a signal at the output of a particular one of the coincidence gates 540, indicating that the three frequency-shift signals ($f$, $f'$, $f''$) have passed through corresponding filters in the three filter banks, is proof that the following relations are simultaneously satisfied:

$$f/F = f'/F' = f''/F''$$

and consequently that said three shift frequencies are true Doppler-shift components. The energized AND-gate 540 will therefore pass a true radial-velocity signal to selector 550, and the OR-gate 560 will emit a signal permitting continuing range indications.

In the embodiment of FIG. 8, there are again provided three filter banks 630, 630', 630'', constructed and fed from associated demodulators 624, 624', 624'' in substantially the same manner as the three filter banks of FIG. 8. The outputs from corresponding filters of banks 630 and 630' are applied to a respective one of a set of difference circuits 641 and the outputs from corresponding filters of banks 630' and 630'' are applied to a related one of a set of difference circuits 641''. Each difference circuit produces an output frequency equal to the difference between its input frequencies. The outputs from corresponding difference circuits of the respective sets 641 and 641'' are applied to respective inputs of each of a set of further difference circuits 645. The outputs from the difference circuits 645 are inserted into respective filters of a further bank 655. The filters of this bank have pass bands whose center frequencies are related as follows to the center frequencies of the pass bands of the filters of the three primary banks:

If $f_p$, $f_p'$, $f_p''$ are the center frequencies of the highest-ranking filters of banks 630, 630' and 630'', then the highest-ranking filter of bank 655 has the center frequency $(f_p - f_p') - (f_p' - f_p'')$, or $(f_p - 2f_p' + f_p'')$. The frequency spread of each filter in bank 655 is related by a similar formula to the frequency spreads of the corresponding filters in each of the first three banks. The base transmission frequencies should of course be so selected that the above expressions have suitable, small but positive, values. This requires that $F+F''>2F'$.

The outputs of the filters of bank 655 are applied to velocity selector 650 and to OR-gate 660.

In the operation of this embodiment, the concurrent energization of a difference gate in each of the three sets proves that the frequency shift signals $f$, $f'$, $f''$ satisfy the equations $f/F=f'/F'=f''/F''$, to within the approximation given by the bandwidths of the three first-order filter banks 630, 630', 630''. Then, the fact that the signal produced by one of the difference gates 645, which signal has the frequency $(f-f')-(f'-f'')=f-2f'+f''$, is passed by the associated filter of bank 655 proves that said frequency shifts additionally satisfy the relations $$\frac{f-2f'+f''}{F-2F'+F''}=\frac{f''}{F}=\frac{f'}{F'}=\frac{f''}{F''} \qquad (11)$$

to within the approximation provided by the filters of the output bank 655. This approximation can be very high in view of the very narrow bandwidth which these filters can be given, if the transmission frequencies $F$, $F'$, $F''$ have been properly selected.

If desired, intermediate filter banks (not shown) may be inserted in the connections between the outputs of difference circuits 640 and the inputs of circuits 645, and between the outputs of difference circuits 640'' and the inputs of circuits 645. The center frequencies and bandwidths of such intermediate filters would be related to the center frequencies and bandwidths of the corresponding filters in each pair of first-order banks (630-630', and 630'-630'') by difference relations of the form $(f_p-f_p')$ for the first bank of intermediate filters, and $(f_p'-f_p'')$ for the second bank of intermediate filters.

Various other configurations of filter banks and difference (and/or addition) circuits may be used according to the invention, in conjunction with a plurality of transmission frequencies, in order to test the proportionality of the frequency shifts observed in the response signals to the related transmission frequencies. The test can be performed to within any desired order of approximation and can be carried to extremely high decrees of accuracy without a corresponding increase in the amount of filters and associated circuirty required, provided the transmission frequency values $F$, $F'$, $F''$ and the interconnections between the filter banks used are suitably selected.

All such embodiments of the invention, including the two described in detail with reference to FIGS. 7 and 8, can of course be used with either the simultaneous type of signal transmission described with reference to FIGS. 1, 2 and 4, or the alternating transmission described with reference to FIG. 3.

It will be noted that those embodiments of the invention, as in FIGS. 5 and 8, which include two (or more) orders of filter banks, e.g. the first-order banks 630–630'–630'' (FIG. 8) and the second-order bank 655, make use of the following well-known mathematical property:

Given two sets of values that are mutually proportional, i.e. a set of values $F$, $F'$, $F''$, . . . and a set of values $f$, $f'$, $f''$, . . . such that all ratios such as $f/F$, $f'/F'$, $f''/F''$ equal a common proportionality factor, then the ratio of any pair of similar linear combinations of said values also equals the common proportionality factor. The phrase "linear combination" is taken with its usually accepted meaning as designating any first-degree polynominal form interrelating the values of the two sets with arbitray coefficients not all zero. Thus, in the Equations 11 used in the description of the operation of FIG. 8, the expressions $(f-2f'+f'')$ and $(F-2F'+F'')$ represent one special instance of similar linear combinations of the values of the two sets, and it is for that reason that the relationships (11) are true. It will, however, be appreciated that in other embodiments of the invention based on the aspect being described the filter banks and associated frequency-computing circuitry may be selected and arranged in various other ways so as to generate other similar linear combinations betwen the shift-frequency signal values such as $f$, $f'$, $f''$, etc. and the transmission-frequency $F$, $F'$, $F''$, etc. Since the ratio of any such pair of similar linear combinations would still be equal to the common proportionality factor $f/F$ characterizing true Doppler-shift frequencies corresponding to a given target radial velocity (cf. Equations 1), all such arrangements would constitute operative embodiments of the invention. The degree of accuracy or resolution afforded by any such embodiment in discriminating against spurious frequency-shift components would depend on the narrowness of the bandwidth of the final filter bank used (such as 655, FIG. 8) and hence on the particular linear combination selected.

According to a further aspect of the invention, the transmission frequencies used may be varied with time rather than remaining fixed. The utility of such a procedure is the following.

Conceivably, in an attempt to foil the anti-scramble radars of this invention, scrambling beacons might be developed so as to change the frequencies beamed at the targets by an appropriate multiplying factor, rather than by an abritrary additive term ($h$) as was asumed herein. It should be noted that the probabiilty of such a development is remote, and would involve serious difficulties. The scrambler beacon computer system would first have to ascertain with precision the true value of the beamed radar frequency, and in view of the Doppler shift due to the target's motion such a computation would require knowledge of the target's course relative to the radar tracking it. Such knowledge is not normally available. It is, however, not entirely inconceivable that a flock of targets could be equipped with scrambler beacons incorporating triangulation radar systems capable of plotting the course of each target with respect to a ground-radar station tracking the targets, thereby enabling the scrambler beacon on each target to retransmit continually a frequency that is directly proportional to the frequency of the radar signals from said ground station, so as to provide the misleading velocity indication. Such an indications, if successfully produced, would not be detectable by the systems of the invention so far disclosed, since the response signals received by the system would, after demodulation, produce frequency-shift signals proportional to the respective transmitted frequencies such as $F$ and $F'$ which would therefore be treated by this system as though they were true Doppler-shift signals, albeit indicative of an erroneous radial target velocity.

The modification of the invention now being described provides a safeguard against such a possibility. The modification is illustrated in phantom lines in FIG. 3, wherein block 309 represents a frequency sequencer connected by a controlling line 311 with transmitter 202 so as to vary both transmission frequencies $F$ and $F'$ thereof with time at a relatively rapid rate, in accordance with any desired program, which may be cyclic but preferably is random. The variations imparted by sequencer 309 to the transmission frequencies $F$ and $F'$ are at all times such that the ratio thereof is preserved. It will be evident that the demodulated frequency signals applied to the respective filter networks 230 and 230', if they be true Doppler signals, will still be passed by corresponding filters of the two networks and produce an output from one of the gates 240, whereas if they represent frequency-scrambled responses or spurious frequency shifts, they will not be passed by corresponding filters and therefore will not elicit any output signal. However, it will also be apparent that in the case of a pair of true Doppler signals the particular output gate 240 applying a velocity signal to selector 250 for a given radial target velocity will vary in dependency on the variations imposed by frequency programmer 309 on the transmission frequencies $F$ and $F'$. There is, accordingly, provided a controlling connection 313 from frequency sequencer 309 to velocity selector 250, which imposes on the indications given by said selector changes corresponding to the changes imposed on the transmission frequencies, whereby a correct velocity indication will at all times be available in the presence of a pair of true Doppler signals applied to the system.

It will be understood that the time-variation feature just described with reference to FIG. 3 is equally applicable to any of the remaining embodiments disclosed.

A great many more embodiments, modifications and refinements may be conceived by those familiar with the art involved without exceeding the scope of the invention. It should be distinctly understood that whereas particular reference has been made in the disclosure to pulsed radar systems, the invention is fully applicable to target-detecting and tracking systems using continuously oscillating electromagnetic waves rather than pulses. In such applications, the two transmitters of the embodiment in FIGS. 1 and 2, would simultaneously and continuously beam wave energy at the frequencies F and F'. In an embodiment generally similar to that of FIG. 3, in such an application, the single transmitter 202 would be arranged to transmit the waves at frequencies F and F' for alternate time intervals. In other respects the embodiments would be largely similar to those described, and the modifications required will be readily conceived by the average skilled radar technician in the light of the explanations here given.

It may be noted that the herein-disclosed feature of the invention utilizing filter networks for comparing the ratio of the demodulated received frequency component signals with the ratio of the transmission frequencies has an additional advantage. Even though the final bandwidth remains limited by the antenna-scan period, the resulting system is less sensitive to noise signals than are conventional Doppler radar systems, owing to the narrow frequency bands of the filters through which said signals are made to pass. This advantage is especially marked in the case of the three-network systems of FIGS. 5 and 8. Because of this, such systems not only accomplish the primary function of the invention in rejecting misleading velocity signals transmitted from scrambler beacons of the kind specified, but at the same time achieve a degree of protection against the less sophisticated type of radar-jamming devices or beacons which act through the simple expedient of generating loud radio noise with a wobble generator or the like. If desired, however, a system according to the invention may be associated with conventional anti-jamming means currently used for protection against this type of wobble jammer.

As already mentioned above, it is to be expressly understood that my present improvement is equally applicable to continuous-wave systems. In fact, the embodiments disclosed herein are immediately transposable to this latter type of system substantially without any other changes than the simplifications arising out of the omission of keying or synchronizing means, as made possible by the continuous character of the waves. For this reason, it has appeared superfluous to illustrate such an embodiment of the invention.

Various other modifications will occur to those skilled in radar made familiar with the present disclosure, as concerns both the details of the radar apparatus to which the invention is applied and the frequency-ratio-comparing devices or frequency-analyzing networks used according to the invention.

What I claim is:

1. A method of radar-monitoring a moving target, comprising the steps of transmitting radio signals towards the target at a plurality of different transmission frequencies; receiving related response signals from the target; demodulating the response signals with the transmitted signals to derive the amount of frequency shift present between each transmitted signal and the related response signal; testing the resulting set of frequency-shift values for proportionality to the set of transmission-frequency values; deriving an information signal concerning target motion from at least one of the response signals; and blanking out the information signal unless said sets of values are substantially proportional.

2. The method claimed in claim 1, including the step of varying said transmission frequencies while keeping the proportionality thereof substantially constant.

3. A method of radar-monitoring a moving target, comprising the steps of transmitting radio signals towards the target at a plurality of different transmission frequencies; receiving related response signals from the target; demodulating the response signals with the transmitted signals in respective channels to derive frequency-shift signals representing the frequency shift present between each transmitted signal and the related response signal; concurrently frequency-analyzing the frequency-shift signals in said respective channels and passing to an output only those frequency components thereof, if any, that are substantially proportional to the respective transmission frequencies; deriving an information signal concerning target motion from at least one of said response signals; and blanking out said information signal in the absence of said frequency components passed to said output.

4. The method of claim 3, wherein said information-deriving step comprises indicating a detected frequency shift signal as a measure of the target's radial velocity.

5. The method of claim 3, wherein said information-deriving step comprises indicating the time displacement between a transmitted signal and the related response signal as a measure of the target's distance.

6. A radar system comprising:
transmission means for transmitting radio signals at a plurality of different frequencies towards a target;
reception means for receiving response signals sent back from the target in response to the respective transmitted signals;
output means operable for deriving from at least one of the response signals a signal representative of information concerning the target;
means for combining each transmitted signal and the related response signal to derive a control signal therefrom representing the frequency shift present therebetween;
ratio-comparison means connected to receive said control signals for comparison thereof with said transmission frequencies and producing an output condition upon the corresponding frequency shifts departing from proportionality with the related transmission frequencies by less than prescribed amounts; and
means operated by said output condition of the comparison means for operating said output means.

7. The system claimed in claim 6, wherein said output means includes means responsive to the time displacement between said one response signal and the related transmitted signal for producing a signal representative of target range.

8. The system defined in claim 6, wherein said output means includes means responsive to the control signal derived from said one response signal for producing a signal representative of the target's radial velocity.

9. The system defined in claim 6, wherein said transmission means includes separate transmitter means for concurrently transmitting said signal, said reception means including respectively associated separate receiver means for concurrently receiving said response signals.

10. The system defined in claim 6, wherein said transmission means includes common multi-frequency transmitter means and means for operating the same to transmit said different-frequency radio signals for alternate periods of time, said reception means including common receiver means for alternately receiving the response signals and means for storing said control signals derived from one of said transmission frequencies until the occurrence of control signals derived from another of said frequencies for simultaneous processing of said control signals from the respective transmission frequencies in the comparison means.

11. The system defined in claim 6, wherein said comparison means comprises analog-computer means.

12. A radar system comprising:
means for transmitting radio signals at a plurality of different frequencies towards a target and means for receiving response signals sent back from the target in response to the respective transmitted signals;
demodulating means for combining each transmitted signal and the related response signal and deriving a demodulated signal representing the frequency shift present therebetween;
ratio-comparison means connected to receive said demodulated signals for comparing same with said transmission frequencies and producing an output condition upon said demodulated signals departing from proportionality with the related transmission frequencies by less than prescribed amounts;
indicator means connectable for operation by one of said demodulated signals; and
means responsive to said output condition from the comparison means to connect said indicator means for operation by said one demodulated signal to indicate the target's radial velocity.

13. The system claimed in claim 12, wherein said indicator means comprises means responsive to time displacement between the response signal giving rise to said one demodulated signal and the related transmitted signal for producing a signal representative of target range, and rate means responsive to the time variation of said time displacement for producing a first rate signal representative of target velocity; further including means connected for operation by said demodulated signal for producing a second rate signal representative of target velocity; comparator means connected to receive said first and second rate signals; and means responsive to a comparator output indicative of discrepancy between said rate signals for disabling said indicator means.

14. A radar system comprising:
transmission means for transmitting radio signals at different frequencies towards a target;
reception means for receiving response signals sent back from the target in response to the respective transmitted signals;
output means operable for deriving from at least one of the response signals a signal representative of information concerning the target;
demodulator means for combining each transmitted signal and the related response signal and deriving a demodulated signal representing the frequency shift therebetween;
a frequency-ratio computer connected to receive said demodulated signals for producing a first magnitude proportional to the ratio thereof;
means for producing a second magnitude proportional to the ratio of said transmissin frequencies;
comparator means connected to receive said magnitudes for producing an output signal condition upon said magnitudes corresponding to ratios differing by less than a prescribed amount; and
means operated by said output signal condition of the comparator means to operate said output means.

15. A radar system comprising:
transmission means for transmitting radio signals at a plurality of different frequencies towards a target;
reception means for receiving response signals sent back from the target in response to the respective transmitted signals;
output means operable to derive from at least one of the response signals a signal representative of information concerning the target;
demodulator means connected for combining each transmitted signal and the related response signal and deriving a demodulated signal representing the frequency shift therebetween;
frequency-analyzer networks respectively connected to receive said demodulated signals and including each a plurality of frequency-selective circuit paths in parallel, corresponding circuit paths in the respective networks having frequency-selecting values substantially proportional to the respective transmission frequencies;
comparison means connected to the outputs of corresponding circuit paths of said networks for sensing the simultaneous passing of demodulated signals therethrough and producing an output signal in response thereto; and
means responsive to said output signal to operate said output means.

16. The system defined in claim 15, wherein said frequency-analyzer networks comprise respective banks of frequency-selective filters respectively connected to receive said demodulated signals and constituting said respective circuit paths, the filters in each bank having substantially contiguous frequency bands with the total frequency of the bank substantially covering the range of Doppler-shift frequencies corresponding to expected target velocities, the central frequencies of corresponding filters in the respective banks being proportional to the respectively related transmission frequencies.

17. The system defined in claim 15, wherein said frequency-analyzer networks include frequency-changing means having first inputs connected to receive said demodulated signals and constituting parts of said respective circuit paths, local oscillator means connected to other inputs of said respective frequency-changing means, said local oscillator means having output frequencies predetermined in proportion to the respectively related transmission frequencies, the frequency outputs of said frequency-changing means being substantially similar in all the circuit paths of each network, and a bank of similar filters connected to said outputs of the frequency-changing means in each network.

18. The system defined in claim 15, wherein said output means includes velocity-indicating means connected for energization by said output signals to indicate the target's radial velocity.

19. The system claimed in claim 15, wherein said comparison means comprise a set of coincidence gates having inputs connected to the outputs of corresponding circuit paths in the respective networks.

20. The system claimed in claim 15, including means responsive to at least one of said response signals to produce a range signal indicative of the target's distance, and means connected to said comparison means and responsive to the non-production of an output signal to disable said range-signal-producing means.

21. The system defined in claim 15, including first indicator means responsive to at least one of said response signals to produce a range signal indicative of the target's distance; second indicator means responsive to the time variation of said range signal for deriving a first rate signal indicative of target velocity; means connected for energization by said output signals produced in response to the simultaneous passing of demodulated signals to provide a second rate signal indicative of target velocity; comparator means connected to receive both said first and second rate signals; and means responsive to a comparator output indicative of discrepancy between said rate signals for disabling said first and second indicator means.

22. The system defined in claim 15, wherein said comparison means comprise circuit means having inputs connected to the outputs of corresponding circuit paths in the respective networks and having outputs producing output frequency values representing similar linear combinations of the frequency values of the demodulated signals applied to said inputs, and at least one set of further frequency-selective circuit paths connected to the outputs of said circuit means, each of said further paths having a central frequency-selecting value substantially equal to the said linear combination of the frequency values of the associated group of corresponding first circuit paths in said networks.

23. The system defined in claim 22, wherein the selected frequency bandwidth of each of said further circuit paths substantially equals the said linear combination of the bandwidths of the associated group of corresponding first circuit paths in said networks.

24. A radar system for determining the speed of a reflecting target, comprising transmitter means for the transmission of at least two outgoing signals at different radio frequencies having a predetermined ratio; reception means for receiving incoming radar signals differing by respective low-frequency components from said radio frequencies; demodulating means connected to said reception means for isolating said low-frequency components; circuit means connected to said demodulating means for determining the ratio of said low-frequency components; comparison means connected to said circuit means for establishing the departure of the last-mentioned ratio forms said predetermined ratio; and output means responsive to said comparison means for indicating the speed of a target as derived from one of said low-frequency components upon said departure falling within a predetermined tolerance range.

25. A system as defined in claim 24, further comprising modulating means connected to said transmitter means for said radio frequencies with maintenance of said predetermined ratio.

References Cited

UNITED STATES PATENTS 2,914,763   11/1959   Greenwood _____ 343—9

RODNEY D. BENNETT, *Primary Examiner.*

C. L. WHITHAM, *Assistant Examiner.*